United States Patent [19]

Laas et al.

[11] Patent Number: 5,473,011
[45] Date of Patent: Dec. 5, 1995

[54] POLYISOCYANATE MIXTURES, A PROCESS FOR THEIR PREPARATION AND THEIR USE AS CROSS-LINKING AGENTS IN COATING COMPOSITIONS

[75] Inventors: Hans-Josef Laas, Cologne, Germany; Rainer Rettig, Amagasaki, Japan; Reinhard Halpaap, Odenthal-Gloebusch; Klaus Nachtkamp, Duesseldorf, both of Germany

[73] Assignee: Bayer Aktiengesellschaft, Leverkusen, Germany

[21] Appl. No.: 869,579

[22] Filed: Apr. 15, 1992

[30] Foreign Application Priority Data

Apr. 23, 1991 [DE] Germany .............. 41 13 160.6

[51] Int. Cl.[6] .................................................. C08G 18/10
[52] U.S. Cl. ................ 524/840; 252/182.2; 252/182.21; 252/182.22; 544/221; 544/222; 528/59; 528/60; 528/73; 528/71; 528/61; 528/65
[58] Field of Search .................... 252/182.2, 182.21, 252/182.22; 524/840; 544/221, 222; 528/59, 60, 73, 71, 61, 65

[56] References Cited

U.S. PATENT DOCUMENTS

| | | | |
|---|---|---|---|
| 3,959,348 | 5/1976 | Reiff et al. | 521/159 |
| 4,186,118 | 1/1980 | Reischl et al. | 524/591 |
| 4,433,095 | 2/1984 | Hombach et al. | 524/563 |
| 4,711,918 | 12/1987 | Kubitza et al. | 524/196 |
| 5,075,370 | 12/1991 | Kubitza et al. | 524/591 |
| 5,098,983 | 3/1992 | Mosbach | 528/59 |

FOREIGN PATENT DOCUMENTS 4001783  7/1991  Germany .

Primary Examiner—James J. Seidleck
Assistant Examiner—R. F. Johnson
Attorney, Agent, or Firm—Joseph C. Gil; Thomas W. Roy

[57] ABSTRACT

The present invention relates to polyisocyanate mixtures having a) an average isocyanate functionality of at least 4.1,
b) a (cyclo)aliphatically bound isocyanate group content (calculated as NCO, molecular weight =42) of 12.0 to 20.5% by weight,
c) a chemically incorporated carboxyl group content (calculated as COOH, molecular weight =45) of 0.01 to 5.0% by weight and
d) an ethylene oxide unit content arranged within terminal or lateral polyether chains of 0 to 10% by weight (calculated as $C_2H_4O$, molecular weight =44).

The present invention also relates to a process for the preparation of these polyisocyanate mixtures and to their use as cross-linking agents in aqueous coating compositions containing water soluble or dispersible binders or binder components.

6 Claims, No Drawings

POLYISOCYANATE MIXTURES, A PROCESS FOR THEIR PREPARATION AND THEIR USE AS CROSS-LINKING AGENTS IN COATING COMPOSITIONS

BACKGROUND OF THE INVENTION

1. Field of the Invention

This invention relates to novel mixtures of carboxyl group-containing polyisocyanates having an average isocyanate functionality of at least 4.1, a process for their preparation and their use as cross-linking agents in aqueous coating compositions.

2. Description of the Prior Art

The importance of aqueous lacquers and coating compositions has greatly increased in recent years due to the progressively stricter guidelines concerning the emission of solvents in the application of lacquers. Although aqueous lacquer systems have become available for many fields of application, they have in many cases only achieved the high quality of conventional, solvent-containing lacquers as regards solvent resistance and chemical resistance by a chemical cross-linking during film formation.

Prior to the present invention few attempts have been made to achieve such cross-linking of aqueous lacquers with compounds containing free isocyanate groups, i.e., to apply the concept of reactive polyurethane lacquers which is well known in the field of solvent-containing coatings to aqueous systems. DE-OS 2,708,442 describes the addition of monomeric organic diisocyanates for improving the properties of aqueous polyurethane dispersions. According to DE-OS 3,529,249, organic polyisocyanates may be used for increasing the solvent resistance and chemical resistance and for improving the wear resistance of coatings based on homo- and copolymers dispersed in water. The described positive effects on the lacquer properties may be attributed to a "urea sheath" formed around the dispersed polymer particles by the reaction of water with the isocyanate groups on the surface of the dispersed particles. Thus, the polyisocyanates used as additives do not act as cross-linking agents for aqueous dispersions of synthetic resins or synthetic resin precursors containing isocyanate reactive groups.

The preparation of an aqueous polyurethane reactive system from selected aqueous polyhydroxyl compounds which have an emulsifying action and low viscosity free polyisocyanates is disclosed in DE-OS 3,829,587. The properties of the lacquer films obtained are similar to those of known two-component lacquers containing solvent. Due to the generally poor dispersibility of organic polyisocyanates in water, however, this process is limited to special polyol dispersions. Transferring this process to other aqueous binders containing isocyanate reactive groups would require hydrophilic, water-dispersible polyisocyanate components.

Aromatic, hydrophilically modified polyisocyanates such as those described in DE-OS 2,359,613 and EP-A-61,628 are not suitable for use in aqueous lacquer systems due to their high reactivity with water and the consequent evolution of carbon dioxide. They are preferably used in the production of foams and for adhesives.

Isocyanate functional cross-linking agents for aqueous coating systems can only be prepared from less reactive (cyclo)aliphatic polyisocyanates.

Hydrophilically modified aliphatic polyisocyanates as additives for aqueous adhesives are described in EP-A 206,059. These polyisocyanates are rendered emulsifiable by the incorporation of polyether chains containing ethylene oxide units. Such hydrophilic polyisocyanates are less suitable for use in the field of lacquers due to the permanent hydrophilic character of the coating because of the relatively high polyether content.

Uretdione group- and carboxyl group-containing polyisocyanate mixtures having average isocyanate functionalities of 1.5 to 4.0 in which the carboxyl groups are present in a storage stable form in the presence of free isocyanate groups may be prepared according to a copending application of the present Applicants (German Patent Application P 4 001 783.4 and U.S. Ser. No. 07/644,798). These carboxyl group-containing uretdione polyisocyanates can readily be stirred into water after neutralization of at least a portion of the carboxyl groups with tertiary amines. Therefore, they are suitable in principle for formulating aqueous two-component polyurethane systems.

An object of the present invention is to provide carboxyl group-containing polyisocyanates having an (average) isocyanate functionality above 4.0 which are stable in storage even though carboxyl groups and isocyanate groups are present in the same molecule; are readily soluble or dispersible in water, if necessary after at least partial neutralization of the carboxyl groups; and are suitable for use as starting components for the production of polyurethane resins and also as cross-linking agents for aqueous binders or binder components in aqueous lacquers.

This objective may be achieved with the polyisocyanate mixtures of the present invention as described hereinafter.

SUMMARY OF THE INVENTION

The present invention relates to polyisocyanate mixtures having a) an average isocyanate functionality of at least 4.1, b) a (cyclo)aliphatically bound isocyanate group content (calculated as NCO, molecular weight=42) of 12.0 to 20.5% by weight, c) a chemically incorporated carboxyl group content (calculated as COOH, molecular weight=45) of 0.01 to 5.0% by weight and d) an ethylene oxide unit content arranged within terminal or lateral polyether chains of 0 to 10% by weight (calculated as $C_2H_4O$, molecular weight=44).

The present invention also relates to a process for the preparation of these polyisocyanate mixtures by reacting A) a polyisocyanate component having an (average) isocyanate functionality of at least 2.1 and containing one or more polyisocyanates having (cyclo)aliphatically bound isocyanate groups with B) a hydroxycarboxylic acid component containing one or more aliphatic hydroxycarboxylic acids having at least one sterically hindered carboxyl group and C) optionally a polyether alcohol component having at least 50% by weight, based on the total weight of the component, of ethylene oxide units within lateral and/ or terminal polyether chains and containing one or more polyether alcohols having a molecular weight of 350 to 3,500, while maintaining an NCO/OH equivalent ratio of 2:1 to 75:1.

Further, the present invention relates to aqueous coating compositions containing these polyisocyanate mixtures, optionally at least partially in a neutralized form, as cross-linking agents for water soluble or dispersible binders or

DETAILED DESCRIPTION OF THE INVENTION

The polyisocyanate component A) to be used in the process according to the present invention has an (average) isocyanate functionality of at least 2.1, preferably from 2.8 to 4.5, and contains one or more organic polyisocyanates having isocyanate groups which are (cyclo)aliphatically bound. The polyisocyanates or polyisocyanate mixtures used as component A) include polyisocyanates having uretdione, isocyanurate, urethane, allophanate, biuret and/or oxadiazine groups which may be prepared by the reaction of monomeric (cyclo)aliphatic diisocyanates, as described, for example, in DE-OS 1,670,666, 3,700,209 and 3,900,053 and in EP-A 336,205 and EP-A 339,396. Suitable diisocyanates for the preparation of such polyisocyanates are those having molecular weights of 140 to 400 and containing (cyclo)aliphatically bound isocyanate groups. Examples include 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethyl cyclohexane (isophorone diisocyanate) and 4,4-diisocyanatodicyclohexyl methane or any mixtures of such diisocyanates. The starting components A) are preferably isocyanate group-containing polyisocyanates predominantly containing trimeric 1,6-diisocyanatohexane, which may be obtained by the known process of catalytically trimerizing 1,6-diisocyanatohexane to form isocyanurate groups. These polyisocyanates preferably have an isocyanate content of 19 to 24% by weight and an (average) isocyanate functionality of 3.4 to 4.4.

All figures given for the isocyanate functionality of the starting polyisocyanates A) are calculated from the isocyanate content and the molecular weight as determined by vapor pressure osmometry.

Component B) is selected from hydroxycarboxylic acids or mixtures of hydroxycarboxylic acids having sterically hindered carboxyl groups. Examples include 2,2-dimethyl-2-hydroxymethyl-acetic acid (hydroxy-pivalic acid), 3-hydroxy-2,2-dimethylpropionic acid, 2,2'-bis-(hydroxymethyl)-acetic acid and 2,2-bis-(hydroxymethyl)-propionic acid (dimethylolpropionic acid, abbreviated DMPA). DMPA is particularly preferred as component B).

Starting components C), which may optionally be used, include polyether alcohols having an ethylene oxide content of at least 50% by weight incorporated as ethylene oxide units in lateral or terminal polyether chains. Examples of such compounds include alkoxylation products of monovalent or higher valent starting molecules as described in EP-A 206,059, page 8, line 26 to page 9, line 17. Such non-ionic, hydroxy functional emulsifiers are used in small quantities such that they are not sufficient on their own to provide dispersibility of the polyisocyanate in water.

Starting component D), which may optionally be used, includes compounds containing hydroxyl groups other than the compounds set forth above for use as components B) and C), preferably polyhydroxyl compounds having a molecular weight of 62 to 200. Examples include ethylene glycol, propylene glycol, glycerol, trimethylolpropane, pentaerythritol and any mixtures of such polyhydric alcohols.

To carry out the process according to the invention, the starting compounds are reacted together at temperatures 10° to 100° C., preferably from 20° to 80° C., while maintaining an NCO/OH equivalent ratio of 2:1 to 75:1, preferably 5:1 to 20:1. The reaction is preferably continued until the theoretically calculated isocyanate content is obtained. The reaction is conducted at a low temperature, depending upon the carboxyl component used, so that an isocyanate/carboxyl reaction is virtually impossible.

The nature and quantitative ratios of the starting components are otherwise so chosen within the conditions mentioned above that the resulting reaction products a) have an average isocyanate functionality of at least 4.1, preferably from 4.2 to 6.0 and most preferably 4.2 to 4.8, b) have an isocyanate content of 12.0 to 20.5% by weight, preferably 15.0 to 19.0% by weight, c) contain 0.01 to 5.0% by weight, preferably 0.1 to 3.0% by weight, of chemically bound carboxyl groups and d) contain 0 to 10% by weight, preferably 1 to 5% by weight, of ethylene oxide units built into terminal and/or lateral polyether chains.

The isocyanate functionality of the reaction products is calculated from the nature and functionality of the starting components in accordance with the following formula $$f = \frac{\Sigma \text{ equivalents NCO} - \Sigma \text{ equivalents OH}}{\Sigma \text{ moles (NCO + OH)} - \Sigma \text{ equivalents OH}}$$

This formula for determining the isocyanate functionality assumes that the carboxyl groups present in the reaction mixture do not react with the isocyanate groups of component A) and that the hydroxyl groups present in the reaction mixture react completely with the isocyanate groups of component A). If a reaction take place between the isocyanate groups of component A) and the carboxyl groups of component D), even to a minor extent, for example due to a high reaction temperature, the result would be a further increase in the isocyanate functionality. Accordingly, the above conditions concerning the minimum functionality would be fulfilled in any event.

The figures previously set forth concerning the carboxyl group content and isocyanate group content refer to the values determined by titration.

The reaction is preferably but not necessarily carried out in a suitable isocyanate inert solvent. Suitable solvents include are known and include ethyl acetate, butyl acetate, ethylene glycol monomethyl and monoethyl ether acetate, 1-methoxypropyl-2-acetate, 2-butanone, 4-methyl-2-pentanone, cyclohexanone, toluene, propylene glycol diacetate, diethylene glycol dimethylether, diethylene glycol ethyl and butyl ether acetate, N-methylpyrrolidone, N-methylcaprolactam and mixtures of these solvents.

The products obtained according to the invention are clear, virtually colorless polyisocyanates having the composition previously set forth. Solutions of the these products in one of the above-mentioned solvents have viscosities of 1500 to 15,000 mPa.s (23° C.) when the solids content is 80% by weight.

The polyisocyanate mixtures obtained according to the invention show no significant drop in their isocyanate content during 90 days storage at room temperature. The unreacted isocyanate groups and the carboxyl groups remain stable in storage; no isocyanate/carboxyl reaction can be observed. The polyisocyanate mixtures can easily be dissolved or dispersed by simply stirring them into water after neutralization of at least part of the carboxyl groups with tertiary amines. Alternatively, solutions or dispersions of the polyisocyanate mixtures may be prepared by introducing the required quantity of amine for the neutralization in water and then dispersing the polyisocyanate mixture, which has not yet been neutralized, in this amine/water mixture with stirring.

Examples of tertiary amine neutralizing agents include trimethylamine, triethylamine, N-methylpyrrolidine, N-methylpiperidine and N-methylmorpholine as well as amino alcohols such as triethanolamine, N-methyldiethanolamine, 2-(N,N-dimethylamino)-ethanol and 2-(N,N-dimethylamino)-isopropanol.

The excellent solubility and dispersibility of the polyisocyanate mixtures according to the invention in water after neutralization is preserved even during 90 days storage at room temperature and thus further confirms the stability of the carboxyl groups in the presence of free isocyanate groups. The reaction of the free aliphatic isocyanate groups with water proceeds relatively slowly in solutions or dispersions of the neutralized product according to the invention. It can be shown by IR spectroscopy that far more than half of the isocyanate groups originally present still remain 3 to 4 hours after dispersion.

The question as to whether the aqueous systems are solutions or dispersions depends primarily on the concentration of hydrophilic groups. This question is of minor importance for the subsequent application of the systems.

The polyisocyanate mixtures according to the invention are valuable starting materials for the production of polyurethane resins by the isocyanate polyaddition process. The polyurethane resins are preferably produced from aqueous solutions or dispersions of the at least partially neutralized polyisocyanates, which can be made to react like aqueous two-component systems in combination with polyhydroxyl compounds dispersed in water. The polyisocyanate mixtures according to the invention are useful as cross-linking agents for lacquer binders or lacquer binder components which are also dissolved or dispersed in water for the production of coatings. The cross-linking agents may be combined with the binders or binder component by simply stirring them together by any desired method before the coating compositions are worked up. The components may also be applied with two-component spray guns.

Examples of lacquer binders or lacquer binder components include polyurethanes dispersed in water, which can be crosslinked with polyisocyanates by virtue of the active hydrogen atoms present in the urethane groups; hydroxyl group-containing polyacrylates dissolved or dispersed in water, preferably having a molecular weight of 1000 to 10,000; and aqueous dispersions of hydroxyl group-containing, optionally urethane-modified, polyester resins which are known from polyester and alkyd resin chemistry.

The aqueous lacquers formulated with the polyisocyanate mixtures according to the invention, in which conventional auxiliary agents and additives may be incorporated, may be used to product coatings having good chemical and physical properties even when dried at room temperature.

The percentages set forth in the following examples are percentages by weight unless otherwise indicated.

EXAMPLES

Example 1 (Process according to the invention)

0.5 equivalents of an isocyanurate group-containing polyisocyanate prepared from 1,6-diisocyanatohexane (HDI) and having an isocyanate content of 21.5%, a viscosity of 3000 mPa.s (23° C.) and an average molecular weight of 760 (determined by vapor pressure osmometry) and an isocyanate functionality calculated therefrom of 3.9, were stirred into 26.7 g of diethylene glycol butyl ether acetate (BDGA) at 50° to 60° C. together with 0.025 mol of dimethylolpropionic acid (DMPA) and 2.26 mmol of a monofunctional polyethylene oxide/polypropylene oxide polyether which was started on n-butanol, contained 80% of ethylene oxide units and had an average molecular weight of 2150. The mixture was stirred until the NCO content of the mixture, determined by titration, had fallen to 14.1%. A clear, virtually colorless solution of a carboxyl group-containing polyisocyanate was obtained after cooling to room temperature. The carboxyl group content (determined by titration) was 0.79% (calculated: 0.84%). The calculated average isocyanate functionality was 4.3. This isocyanate functionality was calculated based on the assumption that no reaction took place between the isocyanate groups and carboxyl groups. The viscosity (23° C.) was 3200 mPa.s.

Monitoring the isocyanate content and the viscosity (23° C.) over a period of 90 days confirmed the storage stability of the product at room temperature:

| Days | NCO content (% based on solids content) | Viscosity (mPa.s) |
| --- | --- | --- |
| 0 | 17.6 | 3200 |
| 30 | 17.4 | 3400 |
| 60 | 17.3 | 3500 |
| 90 | 17.2 | 3800 |

Example 2 (process according to the invention)

0.5 equivalents of the isocyanurate group-containing polyisocyanate used in Example 1 were dissolved in 27.0 g of N-methylpyrrolidone (NMP) together with 0.035 mol of DMPA and 2.29 mmol of the polyethylene oxide/polypropylene oxide polyether from Example 1 and stirred at 50° to 60° C. until an isocyanate content of 13.3% was obtained. The solution of the carboxyl group-containing polyisocyanate had a viscosity (23° C.) of 10,900 mPa.s. The isocyanate functionality (calculated as in Example 1) was 4.6.

50 g of this solution were neutralized with 1.3 g of N-methylmorpholine and then stirred into 120 ml of deionized water. A stable, finely divided dispersion having a light blue tint was obtained.

Example 3 (Use)

A 45% aqueous dispersion was prepared with using 0.74 g of dimethylethanolamine (DMEA) to neutralize 25.6 g of a hydroxyfunctional polyester-polyurethane resin prepared from:

| | |
| --- | --- |
| 4.5% | of soya oil fatty acid |
| 12.5% | of trimethylolpropane |
| 22.4% | of 1,6-hexanediol |
| 15.8% | of adipic acid |
| 18.0% | of isophthalic acid |
| 6.2% | of DMPA and |
| 20.6% | of isophorone diisocyanate. |

After the addition of 0.5 g of a commercially available levelling agent (Byk 301 of Byk GmbH, Wesel), 0.5 g of a commercially available wetting agent (Fluortensid FC 170 of 3M, Dusseldorf-Neuss) and an additional 15.6 g of a 2% aqueous solution of DMEA, 26.5 g of the polyisocyanate solution from Example 1 (which had previously been adjusted to a solids content of 56% with BDGA) were stirred in. The pot life of the two-component aqueous lacquer dispersion was more than 2 hours.

A film of this lacquer dispersion was applied to a glass plate and hardened within 1 hour at room temperature to provide a dust-dry, clear, flawless, high gloss coating which was tack-free after 2 hours. After 7 days, the coating had a König pendulum hardness of 97 s.

A similarly applied coating was dried at a temperature of 80° C. for 45 minutes and had a König pendulum hardness of 113 s. The surface of the coating was unchanged after one minute of exposure to xylene, toluene, butyl acetate and methoxypropyl acetate (MPA). One minute of exposure to acetone caused slight softening of the coating;, however, the softening was reversed when the solvent evaporated.

A film prepared from the polyester-polyurethane dispersion described above, but without the polyisocyanate solution according to the invention, and dried at 80° C. for 45 minutes remained tacky and was strongly swelled or dissolved by xylene, toluene, butyl acetate, MPA and acetone.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate mixture having
   a) an average isocyanate functionality of at least 4.1,
   b) a (cyclo)aliphatically bound isocyanate group content of 12.0 to 20.5% by weight,
   c) a chemically incorporated carboxyl group content of 0.01 to 5.0% by weight and
   d) an ethylene oxide unit content arranged within terminal or lateral polyether chains of 0 to 10% by weight.

2. A process for the preparation of a polyisocyanate mixture having
   a) an average isocyanate functionality of at least 4.1,
   b) a (cyclo)aliphatically bound isocyanate group content of 12.0 to 20.5% by weight,
   c) a chemically incorporated carboxyl group content of 0.01 to 5.0% by weight and
   d) an ethylene oxide unit content arranged within terminal or lateral polyether chains of 0 to 10% by weight,
which comprises reacting
   A) a polyisocyanate component having an (average) isocyanate functionality of at least 2.1 and containing one or more polyisocyanates having (cyclo)aliphatically bound isocyanate groups with
   B) a hydroxycarboxylic acid component containing one or more aliphatic hydroxycarboxylic acids having at least one sterically hindered carboxyl group and
   C) optionally a polyether alcohol component having at least 50% by weight, based on the total weight of the component, of ethylene oxide units within lateral and/ or terminal polyether chains and containing one or more polyether alcohols having a molecular weight of 350 to 3,500, while maintaining an NCO/OH equivalent ratio of 2:1 to 75:1.

3. The process of claim 2 wherein component A) contains an isocyanurate group-containing polyisocyanate having an (average) isocyanate functionality of 3.4 to 4.4 and prepared from 1,6-diisocyanatohexane.

4. The process of claim 2 wherein component B) contains 2,2-bis-(hydroxymethyl)-propionic acid.

5. The process of claim 3 wherein component B) contains to 2,2-bis-(hydroxymethyl)-propionic acid.

6. An aqueous coating composition containing the polyisocyanate mixture of claim 1, optionally at least partially in a neutralized form, and a water soluble or dispersible, isocyanate-reactive binder or binder component.

* * * * *